United States Patent [19]

Tchuempe-Tchuente

[11] Patent Number: 4,507,089
[45] Date of Patent: Mar. 26, 1985

[54] MECHANICAL SUPPORT MODULE FOR NUCLEIC ACID

[76] Inventor: Germain Tchuempe-Tchuente, 11 Square du Docteur Guérin, 35000 Rennes, France

[21] Appl. No.: 592,931

[22] Filed: Mar. 23, 1984

[30] Foreign Application Priority Data

Mar. 24, 1983 [FR] France ............................... 83-05294

[51] Int. Cl.³ ............................................. G09B 23/26
[52] U.S. Cl. .................................................. 434/279
[58] Field of Search ................ 434/277, 278, 279, 280

[56] References Cited

U.S. PATENT DOCUMENTS

| | | | |
|---|---|---|---|
| 3,296,714 | 9/1964 | Klotz | 434/279 |
| 3,594,924 | 7/1971 | Baker | 434/279 |
| 3,802,097 | 4/1974 | Gluck | 434/279 |
| 3,903,616 | 9/1975 | Gage | 434/279 |
| 4,184,271 | 1/1980 | Barnett, Jr. | 434/279 |

Primary Examiner—Harland S. Skogquist
Attorney, Agent, or Firm—Fleit, Jacobson, Cohn & Price

[57] ABSTRACT

The invention relates to a mechanical support module for the construction of different models of nucleic acids or the like.

A module of this type consists of at least one frame (110) carrying a plurality of (n) plates (255) intended for carrying balls representing atoms and sticks or the like representing bonds, arranged so that each plate (255) contains four bases. The arrangement of the bases on the plates and of the plates in space is such that the pathway (T) followed by the genetic information from one plate to the next corresponds to a Moebius strip having more than one twist, which is therefore called a polymoebius global strip.

The invention applies in particular to education, research and industry.

18 Claims, 11 Drawing Figures

MECHANICAL SUPPORT MODULE FOR NUCLEIC ACID

The invention relates to a mechanical support module for constructing different nucleic acid models. It relates more particularly to a frame supporting a plurality of plates which can carry accessories, i.e. balls and sticks or the like, representing purine and pyrimidine bases of a molecule of ribonucleic acid (RNA) and/or deoxyribonuclieic acid (DNA).

In education, as in industry and research, it is very often useful to turn to a concrete physical representation of a molecule of this type in order to gain a better understanding of the biochemical mechanisms, which can otherwise only be grasped using relatively sophisticated means of investigation such as crystallography, electron microscopy, neutron diffusion and data processing. Moreover, apart from the disadvantage which the latter means have of distorting reality, because they most often lead to representations corresponding to projections and not exact space-time representations, they are in any case not readily accessible to an inadequately initiated public.

The object of the present invention is to overcome this disadvantage, the invention relating to a simple working tool which is easy to construct and use and which makes it possible to visualize a biochemical molecule such as a molecule of RNA or DNA.

It relates more precisely to a module consisting of at least one support for a plurality of plates intended for carrying accessories which are in the form of balls representing the atoms and sticks or the like representing the bonds, arranged so as to reproduce purine and pyrimidine bases of nucleic acids, in which module each of these plates incorporates the representation of four puropyrimidine bases chosen from the puropyrimidine bases (A.T.G.C.U.), namely adenine, thymine, guanine, cytosine and uracil, depending on the nucleic acid in question, and from the special hydrogenated or methylated bases $\psi$, $U^{om}$, $G^m$, $G^{om}$, $C^{om}$, $I^m$, I, $G^m$, $C^m$, $A^m$ etc. (pseudo-uridylic acid, 2'-O-methyluridylic acid, N(2)-dimethylguanylic acid, 2'-O-methylcytidylic acid, 1-methylinosinic acid, inosinic acid, 1-methylguanylic acid, 5-methylcytidylic acid, 6-methyladenylic acid etc.) specific for transfer RNAs etc., these lates being orientated and held in position in space, relative to one another, by support means firmly fixed to the frame so that, on the one hand, the physical representation of the hydrogen bonding orbitals of partial coordination number between the pairs of purine and pyrimidine bases constitutes a first Moebius strip, called a Local Moebius strip, and so that, on the other hand, the physical representation of the pathway followed by the genetic biochemical information from one base to the next constitutes a second Moebius strip, called a global Moebius strip or polymoebius strip.

The invention will be understood more clearly with the aid of the attached explanations and figures, in which:

FIGS. 7, 8, 9a and 9b are schematic representations of the means enabling the support plates to be firmly fixed to the frame of FIG. 1.

For greater clarity, the same components carry the same reference numbers in all the figures.

Figure 1:
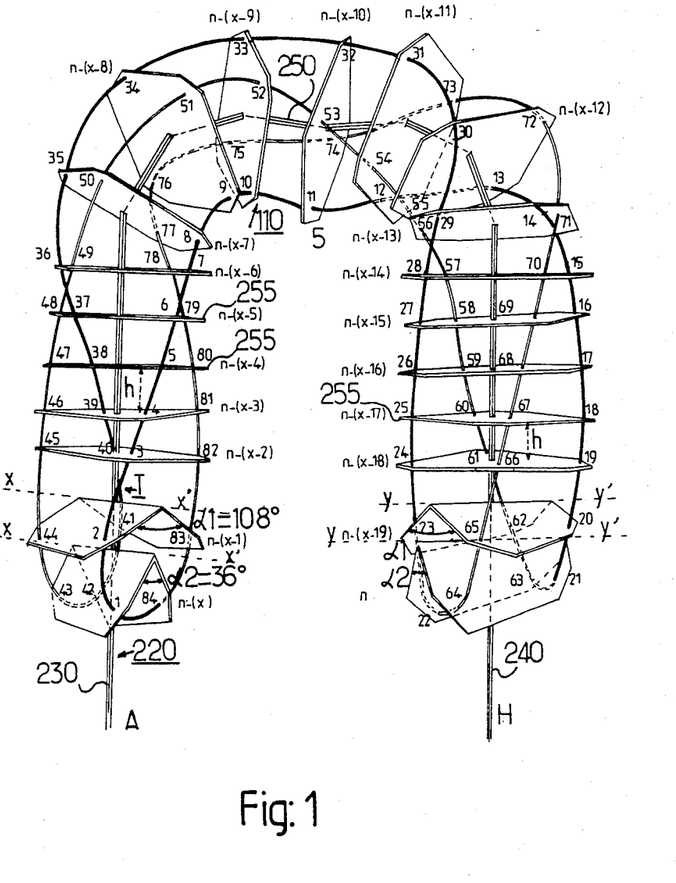
FIG. 1 is a schematic representation of a frame according to the invention.
Figure 2:
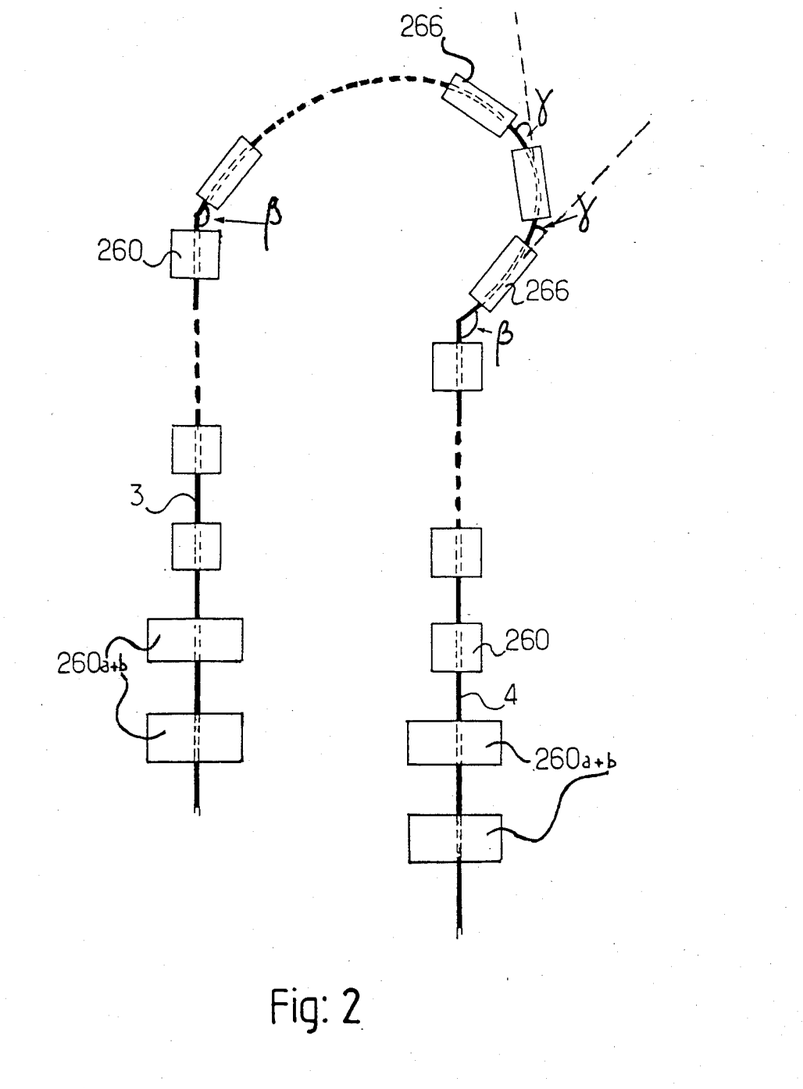
FIG. 2 is a diagram illustrating the spatial arrangement of the skeleton of the frame of FIG. 1.

As shown in FIGS. 1 to 4, a frame 110 according to the invention essentially consists of a skeleton 220, the profile of which is shown spatially in FIG. 2. It consists of two vertical parallel branches 230 and 240 joined by a curved part 250 which is bent in such a way that its curvature forms an angle $\beta = 144°$ (see FIG. 2, which is a schematic representation of the frame 110). A plurality of support plates, such as the plate 255, are threaded onto this skeleton 220 and held in position by holding pieces such as 260, 260a and 260b, and 266, as will be explained later.

Figure 3:
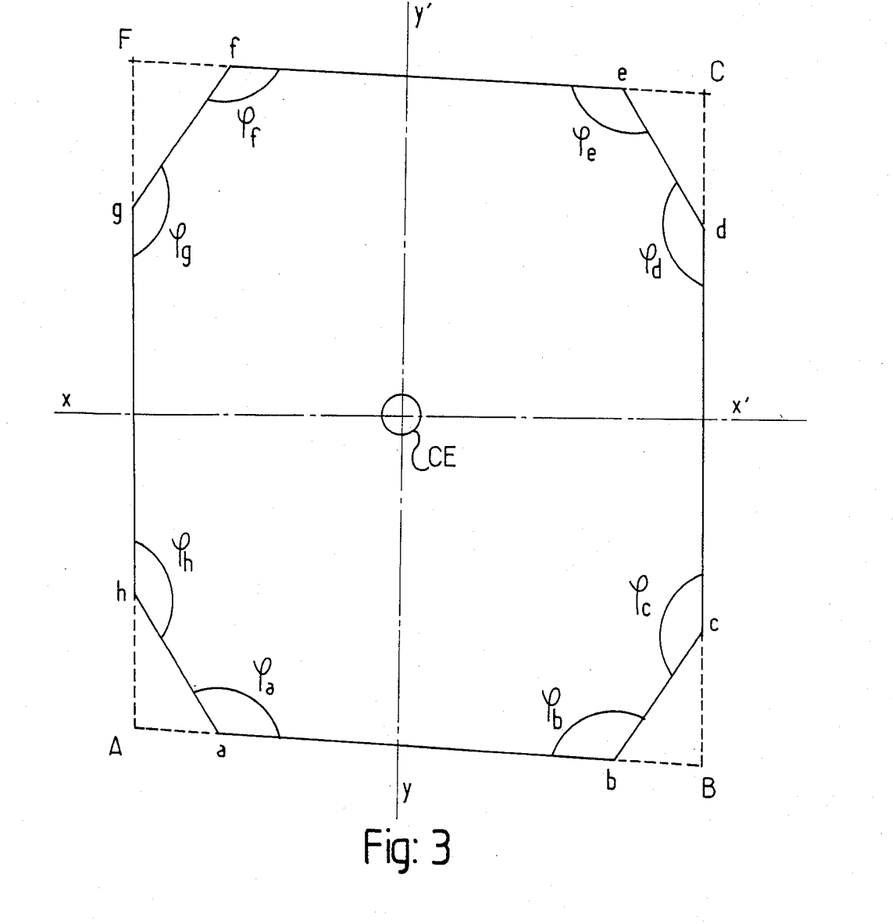
FIG. 3 is a schematic representation of a support plate intended to be carried by the frame of FIG. 1.

As shown in FIG. 3, each of these support plates 255 can be defined as a plate having 8 sides (ab, bc, cd, de, ef, fg, gh, ha) forming angles $\alpha_a$, $\alpha_b$, $\alpha_c$, $\alpha_d$, $\alpha_e$, $\alpha_f$, $\alpha_g$, $\alpha_h$ between them. In a practical embodiment, the values of these angles are as follows: $\alpha_a = 124°$; $\alpha_b = 121°$; $\alpha_c = 161°$; $\alpha_d = 135°$; $\alpha_e = 124°$; $\alpha_f = 121°$; $\alpha_g = 161°$; $\alpha_h = 135°$. The plate can be inscribed inside a parallelogram ABCF, the two axes of which are xx' and yy'. The plates has a hole at its center, $C_E$, so that it can be inserted in the frame 210.

Figure 4:
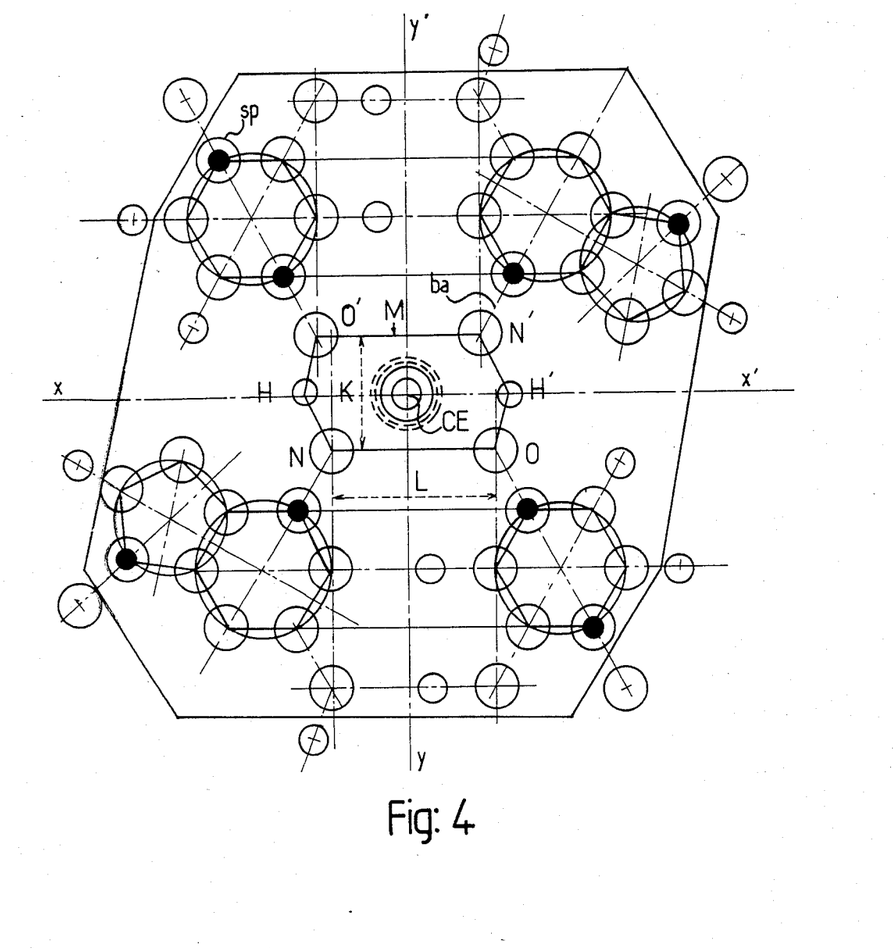
FIG. 4 is a schematic representation of a support plate equipped with its accessories.

Each of the support plates 255 is intended to receive accessories consisting of balls representing the atoms and sticks or the like representing the bonds, these accessories being known per se and commercially available. According to the invention, and as shown in FIG. 4, each support plate 255 is equipped with balls (sp) and sticks or the like (ba), arranged so that it represents tetracyclonucleotides formed of four bases taken from the puropyrimidine bases (A.T.G.C.U.) adenine, thymine, guanine, cytosine and uracil, and the other bases as defined previously, and having a symmetry relative to the axes xx' and yy'.

At the center of the plate, there is a physical representation M of the hydrogen bonding orbitals of partial coordination number between the pairs of purine and pyrimidine bases. According to the invention, this physical representation constitutes a first Moebius strip, called a local Moebius strip, as opposed to the second, global Moebius strip which physically represents the bridges formed between the purine and pyrimidine bases from one plate to the next, as will be explained later.

Seen in section, this physical representation M is defined by a hexagon O'N'H'ONH inside which a parallelogram O'N'ON is inscribed which, in turn, can be inscribed inside an ellipse, so that, knowing the length L of the parallelogram, its height K can immediately be deduced knowing that $K = L\cos 36°$. The hydrogen atoms HH', oxygen atoms OO" and nitrogen atoms NN' are shown.

With these support plates 255 having been described, the description continues with reference to FIG. 1, which shows how they are superposed on the skeleton 220 of the frame 110. There are n of these plates numbered from n to n-(x). In the example described, x is equal to 20 and n is equal to 21, the example corresponding to the tetracyclonucleotides of the transfer RNA of the serine, taken as a non-limiting example to explain the invention more clearly. The Applicant Company has found that the number n of plates for all nucleic acids is of the form: $n=4m+1$ or $n=4m+3$, congruent with one of the terms of the family (1, 3, 5, 7, 9, 11, 15, 17, 19) (modulo 20).

For ease of comprehension and so that the description progresses smoothly, a left side A and a right side H of the frame 110 are arbitrarily defined. The first two support plates n-(x) and n-(x-1) constitute the so-called "left-terminating" support plates, defined in biochemical language as an "allo-termination". The first left-terminating support plate n-(x) is a support plate 255, defined by means of FIGS. 3 and 4, which has the particular characteristic of being bent along the axis xx', forming an angle at the apex $\alpha_2=36°$. It cooperates with a second left-terminating support plate n-(x-1), also identical to the support plates 255 as defined by means of FIGS. 3 and 4, which is also bent along the axis xx', but has an angle at the apex $\alpha_1=108°$. Following these left-terminating support plates n-(x) and n-(x-1), support plates n-(x-2), n(x-3) etc. are superposed successivley on the vertical branch 230 of the skeleton 220 of the frame 110 and are placed perpendicular to the axis of the branch at a defined height (h) which corresponds, according to the scale chosen, to the distance 3.4Å, representing the space between the tetracyclonucleotides. According to an important characteristic of the invention, each plate undergoes, in its plane, a translation h and a linear point rotation in space, relative to the plate preceding it in the sequence. Thus, between the plate n-(x-2) and n-(x-3), if a fixed reference point is taken on each plate, relative to the point of intersection of the two axes xx' and yy', this point will have undergone a rotation through an angle $\phi=36°$ from one plate to the next, and a translation h. These angles of rotation $\phi=36°$ are identical throughout the length of the superposed sequence (convolution).

The curved part is equipped with means 266 for fixing the plates, which will be described later.

Along the branch 240 on the right side, on the second vertical part of the frame, there are superposed support plates which are arranged perpendicular to the axis of the branch 240 in question, at the distance (h) from one another, and which, under the same conditions as for the support plates of the left vertical branch 230, successively undergo, relative to one another, a translation h and a linear point rotation through an angle $\phi=36°$.

Likewise, at the bottom of the frame on the right side H, there are two right-terminating support plates n-(x-19) and n, called a homo-termination (as opposed to the allo-termination), since the first is a support plate 255 bent along the axis yy' with an angle at the apex $\alpha_1=108°$ and the second is also bent along the axis yy' and has an angle at the apex $\alpha_2=36°$.

Summarizing, the frame 110 according to the invention can be described as consisting of five zones distributed as follows: on the left branch 230, a terminating zone (allo-termination) consisting of its two terminating plates n-(x) and n-(x-1), and a linear zone of plates n-(x-2) to n-(x-6), called a left zone since it is arranged perpendicular to the left branch; a curved zone 250 carrying its plates n-(x-7) to n-(x-13); on the right branch 240, a linear zone called a right zone since it is arranged perpendicular to the right branch, and consisting of the plates n-(x-14) to n-(x-18); and finally a right-terminating zone (homo-termination) consisting of the two terminating plates n-(x-19) and n.

The pathway T followed by the genetic biochemical information is physically represented in FIG. 1 partly by a heavy solid line, partly by double broken lines and partly by double solid lines. Each base on each normal support plate 255, or terminating plate, is indexed by a number which increases as the information is read moving in one direction. Thus, starting from the base 1 carried by the left-terminating support plate n-(x), one moves to the base 2 carried by the plate n-(x-1), then 3 carried by the plate n-(x-2), and then 4 up to 7 of the left ascending branch 230. One then comes to the bases 8 to 14 carried by the supports 260 firmly fixed to the curved part 250, continues from 15 to 19 up to the right-terminating support plates (20, 21) and returns along the right branch (63, 62) because of the homo-termination, which explains the jump from 21 to 63, then from 61 to 50 along the curved part 250 and again along the descending left branch 230 from 49 to 45. The two left-terminating support plates (44 to 41) then follow because of the allo-termination. One again follows the ascending left branch 230 (40 to 36), then the curved part 250 (35 to 29), the descending right branch 240 (28 to 24) and then the two terminating support plates (23, 22, 64, 65) because of the homo-termination. One continues along the ascending right branch 240 (66 to 70), the curved part 250 (71 to 77), the descending left branch 230 (78 to 82) and finally the left-terminating support plates (83, 84), returning to the starting point (1).

A model of this type according to the invention therefore shows that the space-time and angular arrangement of the molecule described, which is a molecule built up by a sequence of tetracyclonucleotides, is in the form of a global Moebius strip physically represented by the pathway T described above and called a "polymoebius strip" because it is a Moebius strip possessing more than one twist. Furthermore, it must be seen that the number of plates n of the form $n=4m+1$ or $n=4m+3$, defined previously, corresponds to the solutions of the surface equations, which is perfectly consistent with the concept of Moebius strips expressed in the present invention. This global Moebius strip must not be confused with the local Moebius strips defined previously.

Figure 5:
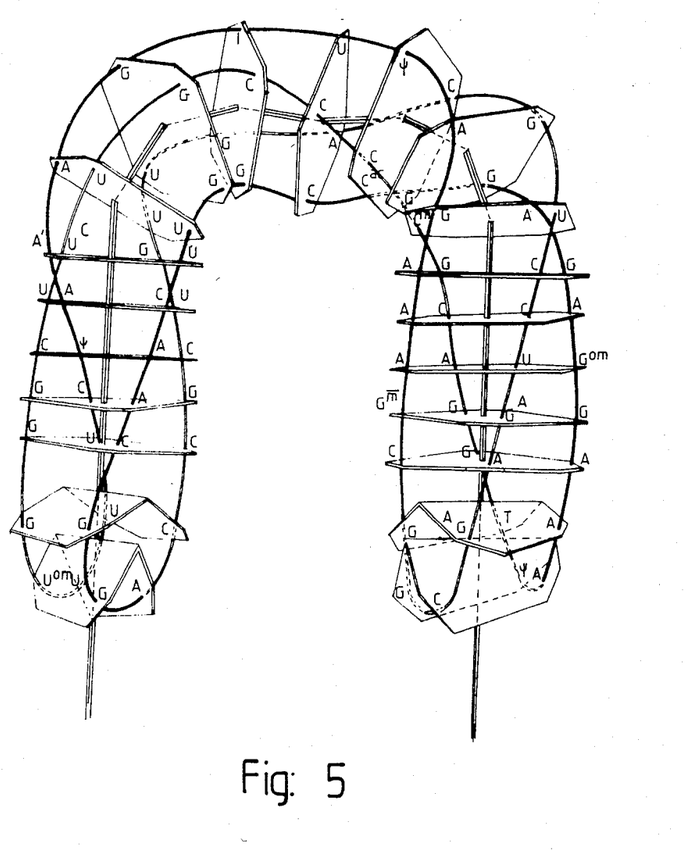
FIG. 5 is a schematic representation of a frame according to FIG. 1 and of the plate equipped with accessories combined so as to represent a molecule of RNA, taken as an illustrative example, in which the numbers 1 to 84 are replaced with the puropyrimidine bases in question.

The superposition of the groups of four puropyrimidine bases along the frame defined here is effected by a translation of 3.4Å, represented on the scale of FIG. 1 by a height (h) of 34 mm, and a spatial rotation of 36°. This construction results in one helical pitch every ten plates. The number of plates is 21 and the number x is equal to 20 for the type of molecule chosen as an example here, namely the transfer RNA of serine. Moreover, FIG. 5 is a schematic representation already shown in FIG. 1, but in which the numbers from 1 to 84 are replaced with letters chosen from A.T.G.C.U., corresponding respectively to adenine, thymine, guanine, cytosine and uracil, and the other bases as defined previously. Their combination and their arrangement on the frame 110 according to the invention leads to a representation corresponding to the tetracyclonucleotides of the transfer RNA of serine. This is an illustration of the invention by means of an example which in no way implies a limitation.

Figure 6:
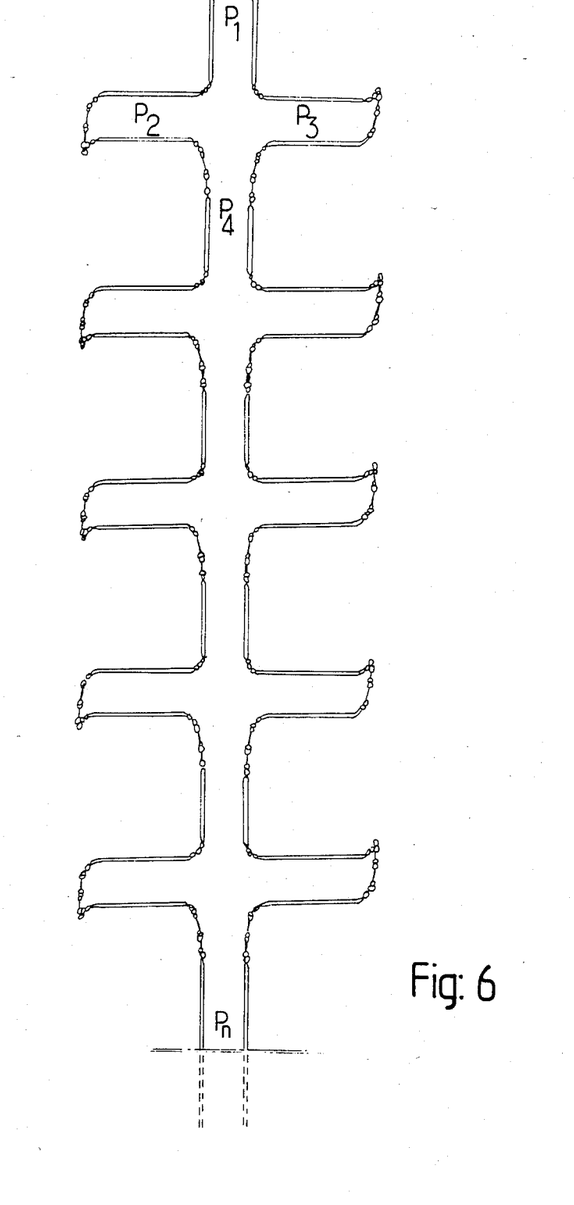
FIG. 6 is a diagram illustrating a combination of frames according to FIG. 1.

It is also possible, using a frame 110 according to the invention, to arrive at the representation of the construction of DNA shown in FIG. 6. This is a combination of frames according to the invention and defined previously. The figure shows an example of the orthogonal arrangement of several frames $P_1$, $P_2$, $P_3$ . . . $P_4$. For reasons of simplification, the plates have not been shown in FIG. 6, but it is quite obvious that they are positioned and orientated in the same way as in the figures described previously.

By varying n, it it therefore possible to use the construction according to the invention for all forms of nucleic acids, as shown in the table below.

| Number of plates | Number of bases | Nucleic acids | |
|---|---|---|---|
| n | B = 4n | RNA | DNA |
| 21 | 84 | transfer (serine) | — |
| 81 | 324 | messenger (histone) | — |
| 87 | 348 | messenger (histone) | — |
| 105 | 420 | — | nucleosome |
| 1347 | 5388 | — | Virus ∅ × 174 |
| 2613 | 10452 | — | Virus SV40 |
| 8169 | 32676 | — | mitochondria of Hela cells |

FIGS. 7, 8, 9a and 9b are examples of embodiments of connecting means intended for fixing the plates 255 firmly to the frame 110 of the invention.

FIG. 7 shows a connecting means 260 consisting of a stop 100 capable of sliding along the straight branches 230 and 240 of the skeleton 220 and of being locked by an check screw 101 at the correct height, which is defined by the height (h) referred to previously. The plate 255 is stuck to this stop 100.

FIG. 8 schematically shows a connecting means 266 intended for fixing the plates 255 firmly to the curved part 250 of the frame 110. It is an example of an embodiment which consists of two female parts 200 and 201 joined to one another by means of a plate 202, the two axes of these two female parts forming an angle $\gamma$ between them, which is equal to 36° in the example chosen, so that $180° - \gamma = \beta = 144°$. These two parts 200 and 201 are intended to receive the components of the skeleton 220 constituting the curved part 250 of the frame 110, the plate 202 itself being intended to receive a plate 255.

FIGS. 9a and 9b show an example of an embodiment of a connecting means 260a, 260b capable of positioning the terminating plates on the right side and on the left side according to the correct angles $\alpha_1$ and $\alpha_2$. It is a cylinder 320 provided with 10 grooves, only seven of which have been shown in order to improve the clarity of the figure. A half-plate 255, cut along the axis xx' or yy', is inserted symmetrically in each of the two grooves 303 and 304 forming an angle $\alpha_2 = 36°$ between them, and in each of the two grooves 305 and 306 forming an angle $\alpha_1$ of 108° between them. This cylinder is bored so that it can slide along the branches 230 and 240 before being locked by any known means, for example a check screw (not shown in the figure).

Figure 10:
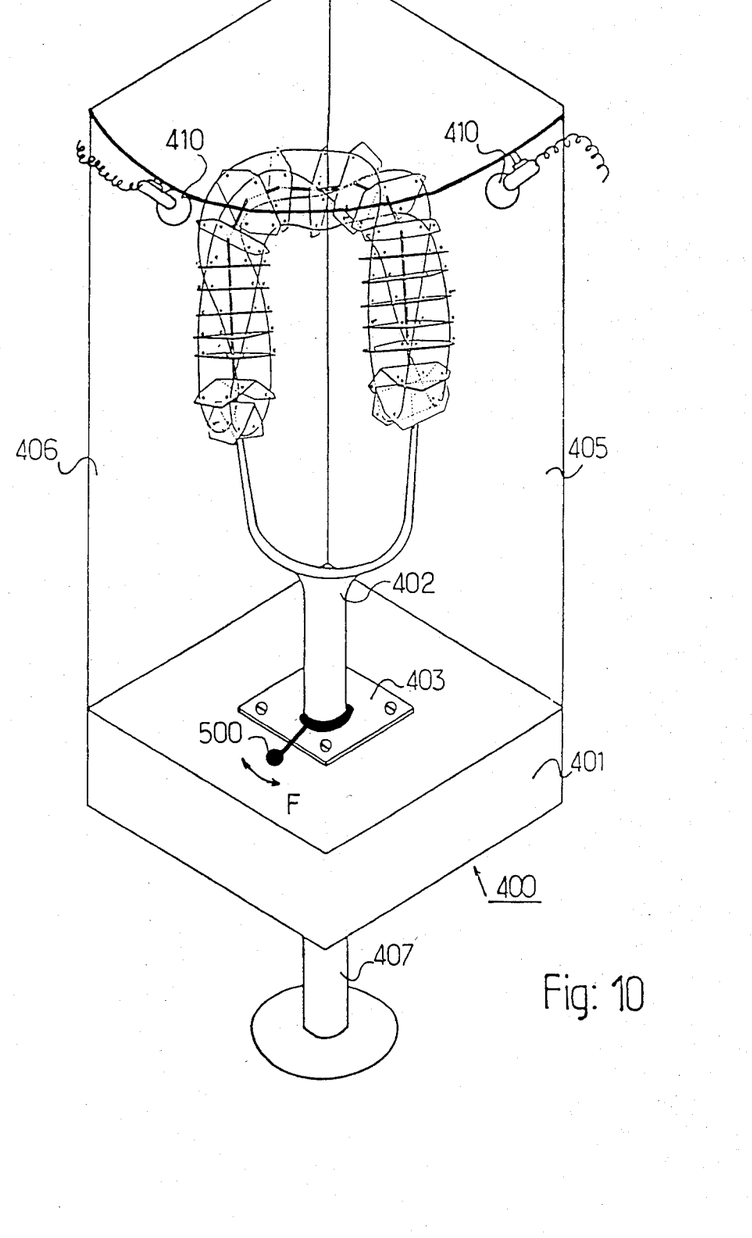
FIG. 10 is a schematic representation of an application of the invention.

FIG. 10 is a schematic representation of a base 400 intended for receiving a frame 110 according to the invention, which is only shown in outline in this figure. This base 400 consists of a fixed plinth 401 firmly attached to a plate 403 in which a shaft 402, carrying the frame 110, is held in such a way that the latter can be rotated by any known means 500, as shown by the arrow F. This plate rests on a foot 407. This plinth 401 carries walls 405 and 406 which form a right-angle between them and which have the characteristic that they can be used as a projection screen. In fact, a lighting means 410, such as an adjustable spotlight, is provided for illuminating the frame 110, with its plates 255 equipped with their accessories, at a defined angle of incidence. When the frame is rotated, a projection of the molecule physically represented according to the invention is obtained on the screens 405 and 406, and experience shows that the projections obtained reproduce the L and gamma profiles already found from investigations carried out on this type of molecule by sophisticated means such as crystallography or neutron diffusion.

Therefore, the module according to the invention is indeed a tool, i.e. a mechanical support, facilitating the construction of different models of nucleic acids.

What is claimed is:

1. A module consisting of at least one frame (110) supporting a plurality of plates (255) carrying accessories which are in the form of balls representing the atoms and sticks or the like representing the bonds, arranged so as to reproduce purine and pyrimidine bases of nucleic acids, wherein each of these plates (255) incorporates the representation of four puropyrimidine bases chosen from the puropyrimidine bases (A.T.G.-C.U.), namely adenine, thymine, guanine, cytosine and uracil, and from the special hydrogenated or methylated bases $\psi$, $U^{om}$, $G^m$, $G^{om}$, $C^{om}$, $I^m$, I, $G^m$, $C^m$, $A^m$ etc. (pseudo-uridylic acid, 2'-O-methyluridylic acid, N(2)-dimethylguanylic acid, 2'-O-methylcytidylic acid, 1-methylinosinic acid, inosinic acid, 1-methylguanylic acid, 5-methylcytidylic acid, 6-methyladenylic acid etc.), depending on the nucleic acid in question, these plates (255) being orientated and held in position in space, relative to one another, by support means firmly fixed to the frame (110) so that, on the one hand, the physical representation (M) of the hydrogen bonding orbitals of partial coordination number between the pairs of purine and pyrimidine bases constitutes a first Moebius strip, called a local Moebius strip, and so that, on the other hand, the physical representation (T) of the pathway followed by the genetic biochemical information from one base to the next and from one plate to the next constitutes a second Moebius strip, called a global Moebius strip or polymoebius strip.

2. The module as claimed in claim 1, wherein the frame (110) consists of a skeleton (220) having a left side (A) and a right side (H) to which straight branches (230) and (240) correspond respectively, these branches being joined to one another by means of a curved part (250) which is bent in such a way that its curvature forms an angle $\beta$, this frame being equipped with support means (260), (260a), (260b) and (266) for the plates.

3. The module as claimed in claim 2, wherein this angle $\beta$ is equal to 144°.

4. The module as claimed in claim 1, wherein each of the plates (255), which has eight sides (ab, bc, cd, de, ef, fg, gh, ha) forming angles ($\alpha_a$, $\alpha_b$, $\alpha_c$, $\alpha_d$, $\alpha_e$, $\alpha_f$, $\alpha_g$, $\alpha_h$) between them, can be inscribed inside a parallelogram (ABCF) having a first axis (xx'), a second axis (yy') and an orifice ($C_E$) centered on the intersection of these two axes (xx') and (yy') and intended for enabling the plate to be connected to the support means (260), (260a) and (266).

5. The module as claimed in claim 4, wherein each plate is equipped with balls (sp) and sticks (ba) or the like, arranged so as to represent four bases having a symmetry relative to the axes (xx') and (yy').

6. The module as claimed in claim 5, wherein the hydrogen bonds of partial coordination number are constructed by means of a representation of a combination of hydrogen atoms (H,H'), oxygen atoms (O,O') and nitrogen atoms (N,N') forming a hexagon (O'N'-H'ONH) inside which a parallelogram (O'N'ON) is inscribed which, in turn, can be inscribed inside an ellipse, so that, for the construction of a plate, knowing the length (L) of the parallelogram, its height (K) can immediately be deduced from the formula $K = L\cos 36°$.

7. The module as claimed in claim 1, wherein there are (n) plates (255) numbered successively from the first plate carried by the straight branch (230) on the left side (A) of the skeleton (220) up to the last plate of the straight branch (240) on the right side (H): n-(x); n-(n-1); n-(x-2) ... n-1 and n.

8. The module as claimed in claim 7, wherein (n) is of the form: $n = 4m+1$ or $n = 4m+3$, congruent with one of the terms of the family (1, 3, 5, 7, 9, 11, 15, 17, 19) (modulo 20).

9. The module as claimed in claim 1, wherein the first two plates n-(x) and n-(x-1), carried by the branch (230) on the left side (A) of the skeleton (220), and the last two plates (n-1) and (n), carried by the branch (240) on the right side (H) of the skeleton (220), are bent along the axis (xx') in the case of the first two and along the axis (yy') in the case of the last two, through angles ($\alpha_1$ and $\alpha_2$), these last two plates respectively constituting terminating plates of the allo-termination type for the left side (A) and of the homo-termination type for the right side (H).

10. The module as claimed in claim 9, wherein the angles $\alpha_1 = 108°$ and the angles $\alpha_2 = 36°$.

11. The module as claimed in claim 1, wherein the plates carried on the straight parts of the branches (230 and 240), other than the terminating plates n-(x), n-(x-1), n-1 and n, are arranged perpendicular relative to one another, at a constant distance (h), each of the plates undergoing a translation h and a rotation through an angle $\phi$ relative to the preceding plate.

12. The module as claimed in claim 11, wherein this angle $\phi = 36°$ and this distance (h) is on the scale proportional to 3.4Å.

13. The module as claimed in claim 1, wherein, throughout the length of the curved part (250), the support means (266) consist of two female parts (200) and (201), the axes of which form an angle $\gamma = 36°$ between them, so that $180° - \gamma = \beta = 144°$, each of these plates undergoing a rotation through an angle $\phi = 36°$, relative to the preceding plate.

14. The module as claimed in claim 1, wherein the number n of plates is 21 and x is equal to 20, which corresponds to the transfer RNA of serine.

15. The module as claimed in claim 1, which consists of a plurality of frames (110) ($P_1, P_2, P_3 \ldots P_n$) arranged orthogonally.

16. The module as claimed in claim 15, wherein this plurality of frames (110) corresponds to the representation of a model of a molecule of DNA or a nucleoprotein.

17. A movable base (400) intended for receiving a frame (110) as claimed in claim 1, which consists of: a plinth (401) carrying a plate (403) in which a shaft (402) supporting a frame (110) can rotate, and adjustable lighting means (410) capable of projecting the whole assembly onto two screens (405, 406) arranged at right-angles and firmly fixed to the plinth (401).

18. The base as claimed in claim 17, wherein, with the shaft (402) having been rotated, the lighting means (410) is adjusted so that a projection in the gamma form and L form, characteristic of the molecule physically represented on the frame, appears on both the screens.

* * * * *